United States Patent

Regan

[15] 3,671,645

[45] June 20, 1972

[54] METHOD FOR INDUCING ANETHESIA

[72] Inventor: Bernard M. Regan, Chicago, Ill.

[73] Assignee: Baxter Laboratories, Inc., Morton Grove, Ill.

[22] Filed: June 29, 1970

[21] Appl. No.: 60,179

Related U.S. Application Data

[62] Division of Ser. No. 699,060, Jan. 19, 1968, Pat. No. 3,579,595.

[52] U.S. Cl. ............................................................ 424/351
[51] Int. Cl. ........................................................ A61k 13/00
[58] Field of Search .................................................. 424/351

[56] References Cited

UNITED STATES PATENTS

| | | | |
|---|---|---|---|
| 2,904,602 | 9/1959 | Ilgenfritz | 260/653.5 |
| 2,921,098 | 1/1960 | Suckling | 260/653.5 |

*Primary Examiner*—Jerome D. Goldberg
*Attorney*—Robert G. Pollock

[57] ABSTRACT

1-bromo-1-chloro-2,3,3-trifluoropropene, useful as a general anesthetic.

1 Claim, No Drawings

METHOD FOR INDUCING ANESTHESIA

This is a division of application Ser. No. 699,060, filed Jan. 19, 1968, now U.S. Pat. No. 3,579,595.

The present invention relates to a novel fluorinated organic compound 1-bromo-1-chloro-2,3,3-trifluoropropene, having the structure:

$$CBrCl=CF-CHF_2$$

More particularly, the present invention relates to the method of utilizing said compound as a general anesthetic for warm-blooded, air-breathing animals.

Preparation of 1-bromo-1-chloro-2,3,3-trifluoropropene is readily accomplished by dehydrofluorination of the corresponding halogenated propane having an additional central fluorine substituent at the point where the olefinic bond is desired.

In a preferred method of preparation of the novel fluorinated organic compound of this invention, 1-bromo-1-chloro-2,2,3,3-tetrafluoropropane is reacted with suitable alkaline material, for example, soda lime, at a temperature of from about 70° C to about 100° C. Substantial conversion to 1-bromo-1-chloro-2,3,3-trifluoro propene has been obtained by this method with reaction times of three hours or more. The novel compound of this invention can then be separated from its reaction components by fractional distillation.

The starting material in the above reaction, 1-bromo-1-chloro-2,2,3,3-tetrafluoropropane, is a known compound and has been described in U.S. Pat. No. 3,177,260.

1-bromo-1-chloro-2,3,3-trifluoropropene is a colorless liquid boiling at 96.5° C at 760 mm and is non-flammable in air or oxygen at ambient temperature. It is preferably stored in amber colored bottles in admixture with conventional stabilizer such as, for example, thymol. It can be administered by any conventional procedure or means suitable for administration of known general anesthetics to warm-blooded, air-breathing animals. The novel compound of this invention also is stable toward soda lime and, therefore, can be used in conventional re-circulation apparatus which employs soda lime for the absorption of carbon dioxide from the subject undergoing anesthesia.

The utility of the novel fluorinated organic compound of the present invention has been further demonstrated by its inhalation margin of safety in mice when compared with several conventional general anesthetics, namely, chloroform, ether and halothane.

The following example is set forth for purposes of further illustration of the present invention. All percentages herein are on a weight basis unless otherwise stated.

EXAMPLE 1-bromo-1-chloro-2,2,3,3-tetrafluoropropane (363 grams), $b_{760}$ 97–98° C, $d^{20}_4$ 1.8893, $n^{20}_D$ 1.3870, of 98.4 percent purity by gas liquid chromatographic (GLC) analysis, and crushed, low moisture soda lime (180 grams containing about 2 percent water) were heated to boiling under total reflux for 54 hours. GLC analysis of the liquid reaction product showed it to be greater than 90 percent 1-bromo-1-chloro-2,3,3-trifluoropropene. The yield of said product was 302 grams, which is 82 percent of theory.

Fractional distillation gave 1-bromo-1-chloro-2,3,3-trifluoropropene, $b_{741}$ 96.0° C, $d^{23}_4$ 1.87 $n^{20}_D$ 1.419 of 98.7 percent purity by GLC analysis. Its $CBrCl=CF-CHF_2$ structure was confirmed by proton nuclear magnetic resonance (NMR) and infrared spectra.

The physiological effects of 1-bromo-1-chloro-2,3,3-trifluoropropene were demonstrated in white mice by subjecting the mice to various concentrations of said compound vaporized in admixture with air in 6.3 dessicator jars with ten mice used for each concentration. The concentration of anesthetic vapor in admixture with air in the jar was calculated in accordance with the ideal gas law and the $AC_{50}$ (volume percent of anesthetic compound required to produce negative righting reflex in 50 percent of the test mice, in five minutes and the $LC_{50}$ (volume percent of anesthetic compound required to kill 50 percent of the test mice in ten minutes) were determined by graphic estimation according to the procedure described by Miller et al., Proc. Soc'y. Exper. Biol. Med., vol. 57, pp. 261–4 (1944). The results, including the calculated inhalation margin of safety ($LC_{50}/AC_{50}$) are set forth in the following table in which the corresponding comparative data for chloroform, ether and halothane determined in identical tests are similarly recorded.

| Compound | $AC_{50}$ | $LC_{50}$ | $LC_{50}/AC_{50}$ |
|---|---|---|---|
| $CBrCl=CF-CHF_2$ | 0.82 | 4.15 | 5.1 |
| Chloroform | 0.94 | 2.56 | 2.7 |
| Ether | 3.69 | 12.0 | 3.2 |
| Halothane | 0.78 | 2.62 | 3.4 |

It is apparent from the above data that 1-bromo-1-chloro-2,3,3-trifluoropropene is a potent anesthetic, has a low toxicity and, overall, has a better margin of safety than the three comparative general anesthetics in common use.

As many widely different embodiments of this invention can be made by the person skilled in the art without departing from the spirit and scope thereof, it is to be understood that this invention is not limited to the specific embodiments thereof except as defined in the appended claims.

What is claimed is:
1. A process for inducing anesthesia in warm-blooded, air-breathing animals comprising administering to said animal by inhalation an effective amount of for inducing anesthesia of $CBrCl=CF-CHF_2$.

UNITED STATES PATENT OFFICE
CERTIFICATE OF CORRECTION

Patent No. 3,671,645          Dated June 20, 1972

Inventor(s) Bernard M. Regan

It is certified that error appears in the above-identified patent and that said Letters Patent are hereby corrected as shown below:

In the title, cancel "ANETHESIA" and insert --ANESTHESIA--.

At col. 1, line 7, the structural formula should appear as follows:
$$CBrCl=CF-CHF_2$$

At col. 2, line 15, after "6.3" insert --liter--; at line 26, cancel "$LC_{50}'AC_{50}$" and insert --$LC_{50}/AC_{50}$; at line 53 cancel "of", first instance.

Signed and sealed this 30th day of January 1973.

(SEAL)
Attest:

EDWARD M. FLETCHER, JR.
Attesting Officer

ROBERT GOTTSCHALK
Commissioner of Patents